United States Patent [19]
Kent

[11] Patent Number: 5,122,266
[45] Date of Patent: Jun. 16, 1992

[54] APPARATUS FOR ADVANCED AQUACULTURE LIFE SUPPORT

[76] Inventor: Dana M. Kent, 7227 Alafia Ridge Loop, Riverview, Fla. 33569

[21] Appl. No.: 490,834

[22] Filed: Mar. 8, 1990

[51] Int. Cl.$^5$ .................................................. C02F 3/06
[52] U.S. Cl. ...................................... 210/150; 210/170; 210/242.2
[58] Field of Search ................ 210/242.2, 150, 151, 210/170, 219

[56] References Cited
U.S. PATENT DOCUMENTS

| | | | |
|---|---|---|---|
| 3,235,234 | 2/1966 | Beaudoin | 210/242.2 |
| 4,350,589 | 9/1982 | Stog | 210/242.2 |
| 4,690,756 | 9/1987 | Van Ry | 210/242.2 |
| 4,906,359 | 3/1990 | Cox, Jr. | 210/242.2 |

*Primary Examiner*—Thomas Wyse
*Attorney, Agent, or Firm*—Dominik, Stein, Saccocio, Reese, Colitz & Van Der Wall

[57] ABSTRACT

Apparatus for the cleaning of water in which the apparatus is positioned, through the biological oxidation of microbiologically digestable compounds within the water, comprising in combination: filter means positionable in the water to be cleaned, the filter means having pluralities of surfaces providing high surface area per volume; biological agents supported on the surfaces for cleaning the water in which it is positioned by digesting microbiologically digestable compounds in the water flowing through the filter means; locating means for locating the filter means spaced from the bottom of the water to be cleaned; pump means with a discharge component for effecting the flow of a pressurized fluid through the water and across the surfaces in circuitous paths for the cleaning and redistribution of the water; and positioning means to position the discharge component beneath the filter means and above the bottom of the water for directing the flow of water through the filter means for cleaning purposes.

2 Claims, 3 Drawing Sheets

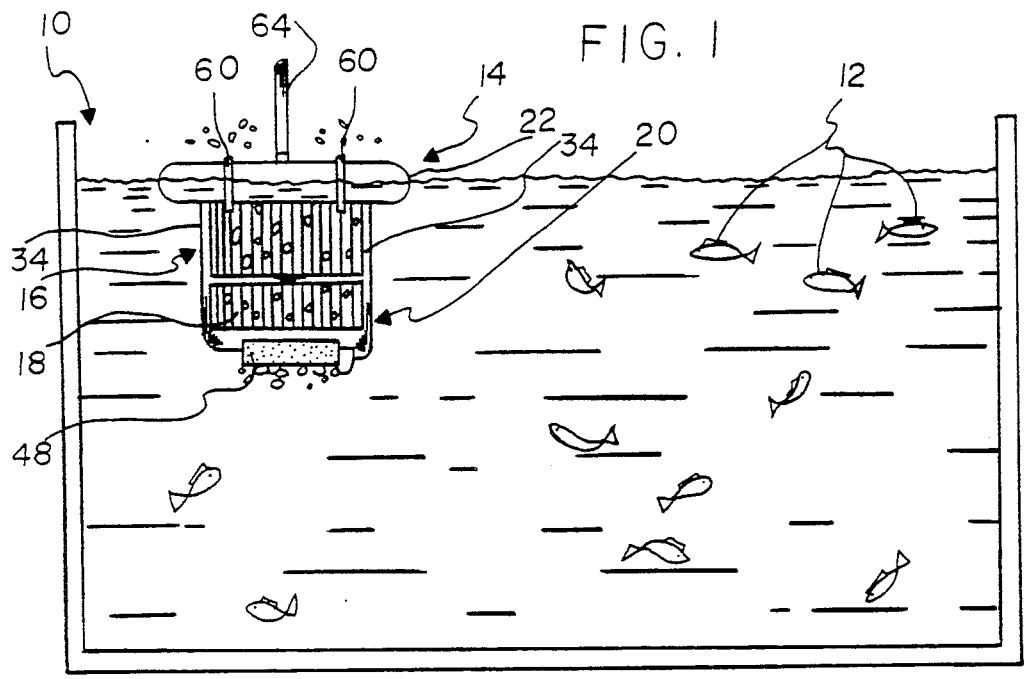
FIG. 1
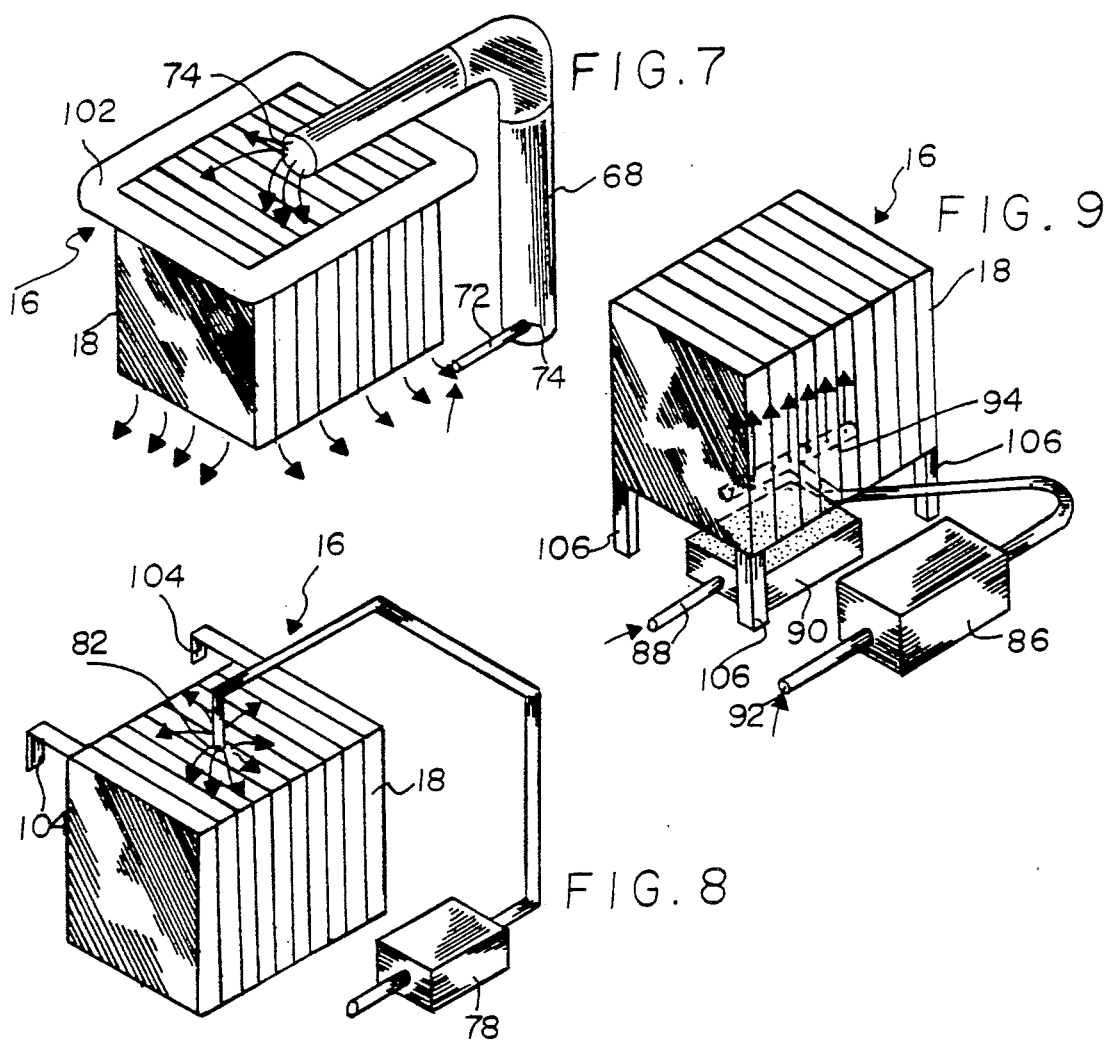
FIG. 7
FIG. 9
FIG. 8

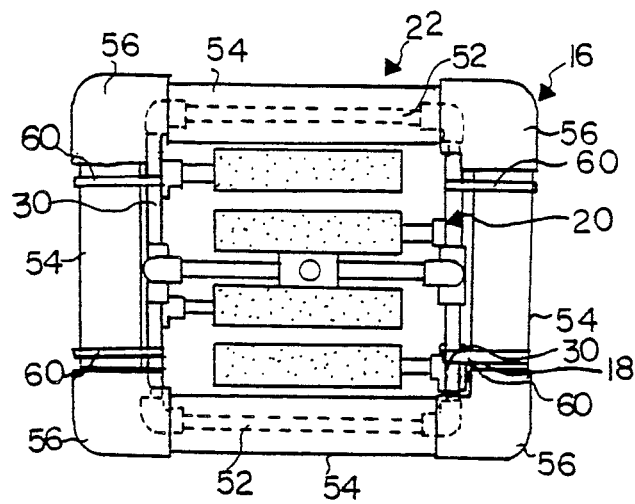
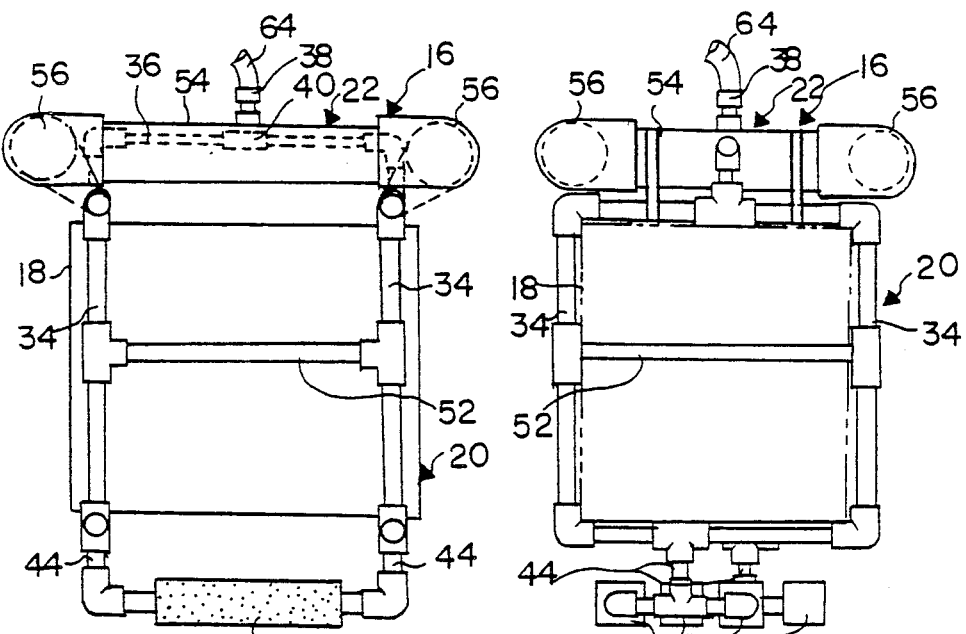
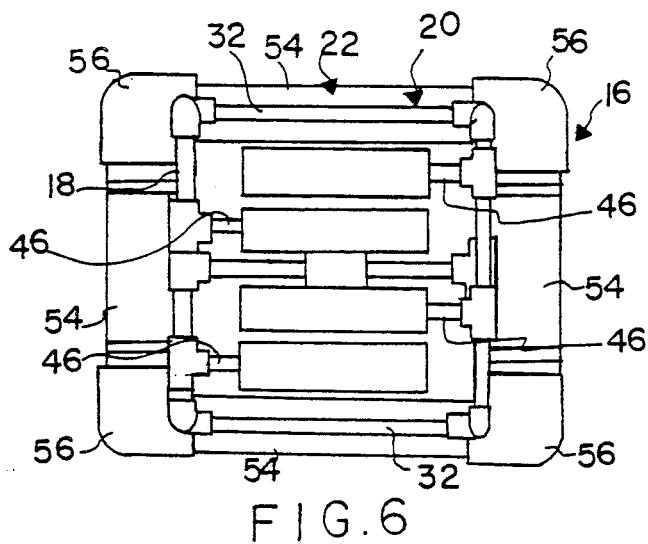

APPARATUS FOR ADVANCED AQUACULTURE LIFE SUPPORT

BACKGROUND OF THE INVENTION

1. Summary of the Invention

This invention relates to a method and apparatus for aquaculture life support and, more particularly, to a method and aparatus comprising filter, support assembly and associated components for effecting a flow of fluid across the filter to effect the oxidation of microbiological digestable compounds within the water in which the apparatus is located.

2. Description of the Background Art

There is an ever-increasing demand for fish. Such fish might be utilized for human consumption, for aquariums, or for a wide variety of other purposes. To meet this demand, fish are grown in reservoirs, aquariums, artificial containers, or the like. The care and maintenance of such fish, however, is an expense which increases the unit cost or price per pound of the fish. A wide variety of techniques have been attempted in the past to increase the efficiency of reservoirs. Such past attempts have been limited in their success.

By way of technical background, fish and other aquatic animals, in both fresh and salt water, take in food through their mouths and oxygen through their gills. They excrete nitrogenous waste into the water. Within such waste is ammonia, a toxic substance which has the negative effects on fish of reducing growth and stressing immune systems which will eventually be fatal. The toxic by-products of this waste are generated in the metabolism of the fish during the natural life sequence. Also in the natural sequence, such toxic by-products are dissolved in water. Only limited quantities of such by-products in water can be tolerated before the negative effects will begin to take their toll.

In the natural sequence, one naturally occurring by-product of the partially toxic water is bacteria that is present in the gut of fish and aquatic animals. Such bacteria would tend to coat surfaces of a reservoir or stones in a pond. Such bacteria would tend to consume, and thus remove, the toxic wastes from the water to extend the usefulness of the water in retaining fish and other marine life.

Various approaches are utilized commercially and are disclosed in the literature for increasing the efficiency of reservoirs. By way of example, note U.S. Pat. Nos. 4,623,454 to Tauscher, 4,634,534 to Cominetta and 4,666,593 to Bosne. These patents disclose filter media for effecting the purification of water thereacross. In addition, U.S. Pat. Nos. 3,852,384 to Bearden and 4,690,756 to Ry disclose mechanisms for effecting a flow of fluids for water purification purposes.

Although many such advances are noteworthy for one purpose or another, none achieves the objectives of an efficient, reliable, inexpensive, convenient to use system for effecting a flow of fluid across a filter to effect the nitrification of the reservoir water in which the system is located.

As illustrated by a great number of prior patents and known commercial techniques, efforts are continuously being made in an attempt to purify reservoir water more efficiently, reliably, inexpensively and conveniently. None of these prior efforts, however, provides the benefits attendant with the present invention. Additionally, prior techniques do not suggest the present inventive combination of method steps and component elements as disclosed and claimed herein. The present invention achieves its intended purposes, objectives and advantages over the prior art through a new, useful and unobvious combination of claimed method steps and components which is simple to use, with the utilization of a minimum number of functioning parts, at a reasonable cost to manufacture and by employing only readily available materials.

Therefore, it is an object of this invention to provide an improved apparatus for use in a fish farming reservoir or the like, for the cleaning of water in which the apparatus is postioned, through the biological oxidation of microbiologically digestable compounds within the water, comprising in combination: filter means positionable in the water to be cleaned, the filter means having pluralities of surfaces providing high surface area per volume; biological agents supported on the surfaces for cleaning the water in which it is positioned by digesting microbiologically digestable compounds in the water flowing through the filter means; locating means for locating the filter means spaced from the bottom of the water to be cleaned; pump means with a discharge component for effecting the flow of a pressurized fluid through the water and across the surfaces in circuitous paths for the cleaning and redistribution of the water; and positioning means to position the discharge component beneath the filter means and above the bottom of the water for directing the flow of water through the filter means for cleaning purposes.

It is a further object of the invention to support a filter so that the flow of reservoir water thereover will effect its purification.

It is a further object of the invention to effect the flow of reservoir water over a filter to effect its nitrification.

It is a further object of the invention to utilize a filter support assembly as a conduit for directing a flow of water purifying air across the supported filter.

Lastly it is an object of the present invention to maximize the quantity of fish which may be grown in a reservoir.

The foregoing has outlined some of the more pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into an improved floating system, for use in a fish farming reservoir or the like, for cleaning biological contaminants from water comprising in combination filter means positionable in the water of the reservoir, the filter means having surfaces for the support of biological agents for assisting in the cleaning and redistribution of the water in which it is positioned; a frame assembly having generally horizontal tubular upper and lower frame members and generally vertical tubular intermediate frame members joining the upper and lower frame members thereby constituting a three-dimensional generally cubic shape, the tubular members adapted for receiving and supporting the filter means in the water, the tubular members being hollow and operatively interconnected for the passage of fluid therethrough and with a first opening operatively associated with an upper frame member for coupling with a source of pressurized fluid and with a second opening associated with a lower frame member for coupling with diffuser means for effecting discharge of the pressurized fluid from the source of pressurized fluid upwardly through the water and across the surfaces of the filter means for cleaning of the water by the biological agent supported on the surface of the filter means; and a float ring secured with respect to the frame assembly and being horizontally disposed for providing the necessary buoyancy for maintaining the upper surface of the frame assembly adjacent to the surface of the water and with the lower surface of the frame assembly spaced from the bottom of the reservoir.

The invention may also be incorporated into an improved apparatus, for use in a fish farming reservoir or the like, for the biological oxidation of nitrogenous compounds from water comprising in combination filter means positionable in the water of the reservoir for assisting in the cleaning of the water in which it is positioned; a frame assembly having frame members thereby constituting a three-dimensional geometric shape, the tubular members providing a space for receiving and supporting the filter means in the water, the tubular members being hollow and operatively interconnected for the passage of fluid therethrough; first opening means operatively associated with one frame member with a fitting for coupling with a source of pressurized fluid; second opening means associated with another frame member for effecting discharge of the pressurized fluid through the water and across the surfaces of the filter means for cleaning the water; and means to maintain the filter means spaced from the bottom of the reservoir.

The three-dimensional geometric shape may be rectangular or cubic. The frame assembly is fabricated from plastic pipes and fittings. The means to maintain is a float ring. The apparatus further includes strapping means coupling the frame assembly and the float ring. The apparatus further includes diffuser means coupled to the second opening means. The second opening means is a plurality of openings and diffuser means is a plurality of diffusers made from gas permiable plastic material.

In addition, the invention may also be incorporated into apparatus for use in a fish farming reservoir or the like, for the biological oxidation of nitrogenous compounds from water, comprising in combination filter means positionable in the water of the reservoir, the filter means having surfaces for the support of biological agents for assisting in the cleaning and redistribution of the water in which it is positioned; frame means providing a space for receiving and supporting the filter means in the water for the passage of fluid therethrough; pump means for effecting discharge of a pressurized fluid through the water and across the surfaces of the filter means in circuitous paths for cleaning and redistribution of the water; and means to maintain the filter means spaced from the bottom of the reservoir.

Further, the invention may be incorporated into an apparatus for the cleaning of water in which the apparatus is positioned, through the biological oxidation of microbiologically digestable compounds within the water, comprising in combination: filter means positionable in the water to be cleaned, the filter means having pluralities of surfaces providing high surface area per volume; biological agents supported on the surfaces for cleaning the water in which it is positioned by digesting microbiologically digestable compounds in the water flowing through the filter means; locating means for locating the filter means spaced from the bottom of the water to be cleaned; pump means with a discharge component for effecting the flow of a pressurized fluid through the water and across the surfaces in circuitous paths for the cleaning and redistribution of the water; and positioning means to position the discharge component beneath the filter means and above the bottom of the water for directing the flow of water through the filter means for cleaning purposes.

Lastly, the invention may also be incorporated into a method for the cleaning of water through the biological oxidation of microbiologically digestable compounds within the water comprising in combination the steps of: positioning a filter means in the water to be cleaned, the filter means having pluralities of surfaces providing high surface area per volume; supporting biological agents on the surfaces for cleaning the water in which it is positioned by digesting microbiologically digestable compounds in the water flowing through the filter means; locating the filter means spaced from the bottom of the water to be cleaned; providing a pump means with a discharge component; effecting the flow of a pressurized fluid by the pump means, from the discharge component, through the water, and across the surfaces in circuitous paths for the cleaning and redistribution of the water; and positioning the discharge component beneath the filter means and above the bottom of the water for directing the flow of water through the filter means for cleaning purposes.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other methods and structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the invention, reference should be had to the following description taken into conjunction with the accompanying drawings in which:

FIG. 1 is a schematic illustration of a system constructed in accordance with the present invention, the system having been deployed in a reservoir for purification of its water.

FIGS. 3 through 6 are front and side elevational views as well as top and bottom plan views of the filter system of FIG. 2.

FIGS. 7 through 9 are illustrations of alternate embodiments of the invention.

Similar reference characters refer to similar parts throughout the various Figures.

DETAILED DESCRIPTION OF THE INVENTION

Figure 2:
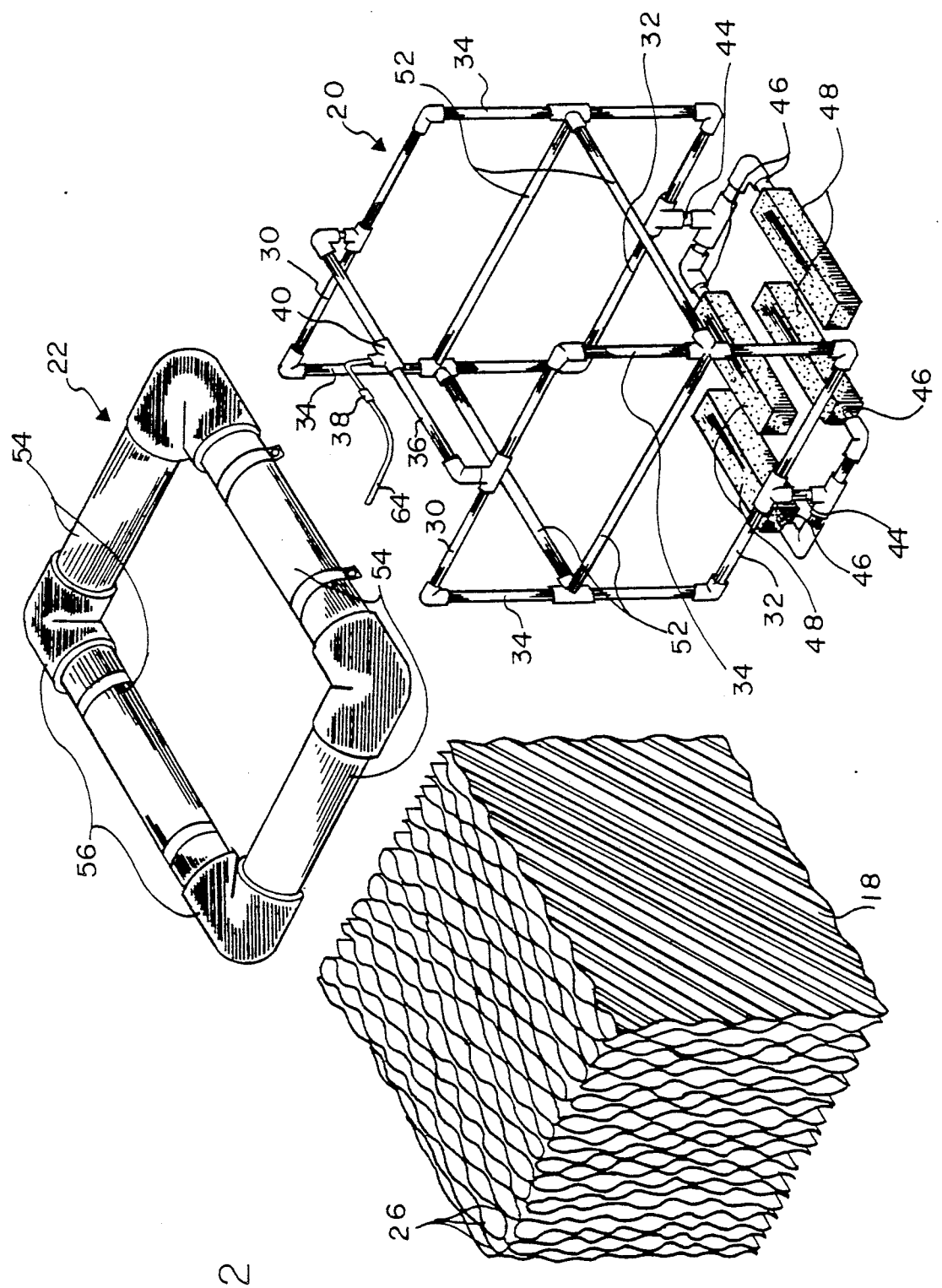
FIG. 2 is an exploded perspective view of the filter system shown in FIG. 1.

Shown in FIG. 1 is a fish farming reservoir 10 in which fish 12 are grown for food, ornamental, or other purposes. The filter system 14 of the present invention is shown in FIG. 1 but is better seen in the exploded perspective illustration of FIG. 2 and in the additional plan and elevation views. The system includes a life support module 16 which includes a filter 18 and a support assembly 20 as well as associated components 22.

The filter 14 itself is shown in its preferred embodiment as a commercially available unit fabricated of corrugated rigid PVC sheets 26 in a preselected modular shape, preferably cubic. Other shapes are readily utilized such as a rectangle, cylinder, sphere, or the like. The fluid travels upwardly at an angle through a series of serpentine channels formed by the corrugations of each layer of rigid PVC sheeting laid on each other. Filters manufactured by Munters Corporation under the trade name "Biodec" are representative of the category and type of filter used. Another acceptable filter is that disclosed in U.S. Pat. No. 4,634,534 to Cominetta, the subject matter of which is incorporated by reference herein.

Preferred filters are those which provide pluralities of facing surfaces for the flow of water therethrough. Such surfaces allow for the flowing fluid to follow circuitous paths defined by the surfaces. Further, they provide high surface area per unit volume of filter for greater efficiency.

Fish consume oxygen and generate ammonia and other nitrogen based compounds as waste products in their daily metabolic activities effectively reducing the amount of oxygen in the water while increasing the toxic bi-products. The quantity of fish which can live within the reservoir is increased with an increase in the amount of available oxygen in the water. Conversely, the quantity of fish which can live in the reservoir is decreased by the increase of toxic ammonia in the water. The ability of fish to survive and grow in water is increased by removing the ammonia/nitrogen waste products through the process of nitrification. During nitrification, the ammonium/nitrogen is converted into nitrite and then non-toxic nitrate by bacteria normally found in water. These bacteria are naturally present in low concentratons and can be supplemented by commercially available cultures that result in a bacterial colony within the fish reservoir. The colony requires a host location upon which it, too, may thrive and grow. The filter of the present invention constitutes such a host location. In order to increase nitrification, and, thus, the health of the fish and the reservoir fish, the filter system is operatively positioned within the reservoir. The filter system is small, esthectically pleasing and uniquely efficient in carrying out the nitrification process.

The filter 18 is that part of the system over which the water flows to effect its cleaning or purification by nitrification, the biological oxidation of microbiological digestable compounds within the water. The bacteria grow on the surface of the filter and convert the dissolved organic waste material and the ammonia nitrogen into stable bi-products including carbon dioxide, nitrites and then nitrates. The biological solids are dropped to the bottom of the fish farming reservoir and are removed later for clarification. The filter methodology of the present invention involves low power consumption, extremely high reliability, and the lack of moving parts therein.

The speed of the initial colonization of the filter material can be enhanced by the addition of any one of several commercially available live bacterial cultures, such as produced by Aqua Bacta Aid Water from Quality Science, Inc. of Bolivar, Mo., or Cycle from Hagan (U.S.A.) Corp. of Mansfield, Mass. These cultures incorporate several species of bacteria whose qualitative and quantitative populations in the filter material fluctuate as a direct function of the qualitative and quantitative nutrient and oxygen supply available in the reservoir. Once seeded and colonized, the filter material becomes a self regulating entity that continually adjusts and stabilizes to any alterations in water quality. Only extreme circumstances, i.e., removal from water and drying totally out and death of all bacteria colonies, or the addition of strong antibiotics, or toxic chemicals deleterious to both bacteria and fish, will totally extinguish the colony and require the reseeding of the filter The filter 18 is located in the proper operative position and orientation above the lower surface of the reservoir by the hollow tubular frame assembly 20. The filter 18 is housed within a three dimensional zone established and defined by the hollow tubular frame assembly. The hollow tubular frame assembly has upper horizontal parallel frame members and lower horizontal parallel frame members 32 connected at each corner by vertical joining tubes 34 forming side rectangles. The film 18 is supported on paralle frame member. The upper horizontal frame member also has a hollow tubular transverse crossmember 36 with an air inlet hole 38 in a coupling 40. The air inlet coupling 40 connects to a non-illustrated air compressor by conventional air tubing.

As can best be seen in FIG. 2, the lower horizontal frame members 32 are coupled by tubes 44 to a plurality of openings 46 which function as air outlets. Each air outlet is coupled to an air discharge diffuser 48 which constitutes a discharge component located below the filter but above the bottom of the water and reservoir. The air diffusers are arranged to evenly distribute air flow upwards to all surfaces of the filter 18. The air diffusers 48 are paired and attached to the leftmost portion of the lower horizontal frame members and disposed towards the rightmost porton of the lower horizontal frame members. Additional air diffusers are paired and attached to the rightmost portion of the lower horizontal frame members and disposed towards the leftmost portion of lower horizontal frame members. Intermediate frame members 52 join the midpoints of the vertical tubes 34. The frame thus permanently encloses the filter material.

The hollow tubular frame assembly 20 and the filter 18 are supported in the water by a float ring 22. The float ring is assembled from tubular hollow pipe 54 and fittings 56, preferably, PVC or ABS pipe and fittings or solid buoyant material such as styroform.

The shape of the float ring is rectangular. In the preferred embodiment, the float ring has a square shaped. The size and diameter of the pipe comprising the float ring is determined by buoyant effect required to keep an upper surface of the filter spaced below the top surface of the water level in the fish farming reservoir. The lower surface is spaced from the bottom of the water in the reservoir. The float ring is secured to the frame assembly with straps 60 or other types of rigid supports. Alternatively, the float ring can be attached to the wall of the fish farming reservoir with mounting clips or horizontal supports coupled with respect to the reservoir or on legs resting on the reservoir floor.

During operation and use, the filter 18 and hollow tubular frame 20 assembly are placed in the fish farming reservoir. The hollow tubular frame assembly is coupled to a fluid source by a flexible line 64. The flexible line is coupled at its input to the source of fluid and, at its output end, to the fitting at the upper opening 38 of the hollow tubular frame assembly 20. The fluid, air in the disclosed preferred embodiment, is forced to flow across the surfaces of the filter media thus effecting a flow of air with water to be cleaned by the nitrification process as described above. The use of oxygen, either pure or in concentrations higher than that found in ambient air, is also an alternative source of fluid.

An alternative embodiment, as best seen in FIG. 7, utilizes the mixing of air with the contaminated water and directing the flow of the air/contaminated water mixture downwardly through the serpentine channels in the filter. An induction pipe 68 is located in a remote portion of the fish farming reservoir 10 and has a lower end open and adapted to induce contaminated water therein. An air induction pipe 72 also has the induction inlet 74 immediately adjacent to the lower end of the pipe 68 for mixing contaminated water and air in a mixing chamber within the induction pipe to create an air lift. The air/contaminated pipe water mixture travels upward through the induction pipe 68 and is discharged through an opening 74. The flow of the air/contaminated water mixture is directed downwardly through the plurality of serpentine channels of the filter 18 and is subsequently discharged at a lower portion of the filter. The bacteria located on the surface of the filter perform the oxygen/nitrogen exchange with the passage of the air/contaminated water mixture across the surface of the filter.

Another alternate embodiment of the invention is best seen in FIG. 8. A submersible water pump 78 is located above the floor of the fish farming reservoir. The water pump 78 is adapted to take contaminated water from beneath the lower levels of the filter 18 and to pump the contaminated water through a piping arrangement upwards to the top surface of the wate in the fish farming reservoir. The piping arrangement has a remote end 82 for discharging the pressurized contaminated water downwardly across the surface of the filter 18 for the oxygen/nitrogen exchange between the bacterial animals on the surface of the filter and the contaminated water.

A still further alternative embodiment, as seen in FIG. 9, has a submersible water pump 86 located on the floor or the fish farming reservoir. In addition, pressurized fresh air or oxygen is brought in from a non-illustrated air compressor thorugh air tubing 88 and connected to an air diffuser 90, as in the primary embodiment of FIGS. 1 through 6. The water pump has an open end 92 to receive unpressurized contaminated water and a discharge end 94, located immediately above the diffuser 90, to discharge the pressurized comtaminated water upwardly through the serpentine passages and acorss the surface of the filter 18. In addition, the air diffuser 90, because of its location with respect to the open end 92, is adapted to discharge pressurized fresh air or oxygen concurrently through the serpentine passages and accomplish the oxygen/nitrogen exchange between the bacterial animals on the surface of the filter and the contaminated water.

As referred to hereinabove, the module 16 may be supported in the reservoir as by the float ring 22 illustrated in the primary embodiment. The module 16 may also be supported by a bouyant material such as styrofoam or the like. This is illustrated by a bouyant ring 102 surrounding the frame in the FIG. 7 embodiment which supports the filter at a predetermined level with respect to the surface of the water.

In the FIG. 8 embodiment, a clip 104 is secured to the module 16 at one end. The other end of the clip is adapted to be secured to the edge of the reservoir 10 which supports the filter at a predetermined level with respect to the top of the reservoir or bends to accommodate changes in water level.

Lastly, the FIG. 9 embodiment utilizes a support structure 106 comprising legs extending downwardly from the frame 20 of the module 16 and supports the filter at a predetermined level with respect to the bottom of the reservoir. The legs may be separate elements or they may be coupled together at their upper extents to thereby constitute a unitive structure so constructed as not to interfere with the flow of fluid through the filter 18.

Any of the various supports for the various modules may be used interchangeably, depending on the particulars of the application, so long as the function is retained of properly positioning the module 16 spaced above the floor of the reservoir for allowing proper operation and use.

While the present invention has been described in a preferred and alternate embodiment, it is not intended to be so limited, but it is intended to be protected broadly within the spirit and scope of the appended claims. Now that the invention has been described,

What is claimed is:

1. a fish farming system comprising a reservoir and a floating apparatus for cleaning biological contaminants from water in the reservoir comprising in combination:
   filter means positionable in the water of the reservoir, the filter means having corrugated surfaces in facing contact defining closed tubes for the support of biological agents for assisting in the cleaning and redistribution of the water in which it positioned;
   a frame assembly having generally horizontal tubular upper and lower frame members and generally vertical tubular intermediate frame members joining the upper and lower frame members thereby constituting a three-dimensional generally cubic shape, the tubular members adapted for receiving and supporting the filter means in the water, the tubular members being hollow and operatively interconnected for the passage of fluid therethrough and with a first opening operatively associated with an upper frame member for coupling with a source of pressurized fluid and with a second opening associated with a lower frame member;
   air stone means constituting a diffuser means coupled with the second opening for effecting discharge of the pressurized fluid from the source of pressurized fluid upwardly through the water and across surfaces of the filter means for cleaning of the water by the biological agent supported on the surface of the filter means; and a float ring secured with respect to the top of the frame assembly and being horizontally disposed for providing the necessary buoyancy for maintaining the upper surface of the frame assembly adjacent to the surface of the water and with the lower surface of the frame assembly spaced from the bottom of the reservoir.

2. The apparatus as set forth in claim 1 wherein the air stone means includes a plurality of air stones symetrically located beneath the filter means.

* * * * *